United States Patent
Fraser et al.

(10) Patent No.: US 11,873,539 B2
(45) Date of Patent: Jan. 16, 2024

(54) FERRONICKEL ALLOY DIRECT REFINING PROCESSES AND PROCESSES FOR PRODUCING NICKLE SULFATE OR OTHER NICKEL PRODUCTS

(71) Applicant: HATCH LTD., Mississauga (CA)

(72) Inventors: Robert John Fraser, Oakville (CA); Jacqueline Fossenier, Mississauga (CA); Maryam Neisani, Mississauga (CA); Louiza Kahina Harkouk, St. Lazare (CA); Amir Mohammad Nazari, Mississauag (CA); Fangyu Liu, Mississauga (CA)

(73) Assignee: HATCH LTD., Mississauga (CA)

( * ) Notice: Subject to any disclaimer, the term of this patent is extended or adjusted under 35 U.S.C. 154(b) by 0 days.

(21) Appl. No.: 17/977,459

(22) Filed: Oct. 31, 2022

(65) Prior Publication Data
US 2023/0193423 A1    Jun. 22, 2023

Related U.S. Application Data (63) Continuation of application No. PCT/CA2022/050003, filed on Jan. 4, 2022.

(60) Provisional application No. 63/133,692, filed on Jan. 4, 2021.

(51) Int. Cl.
*C22B 23/06* (2006.01)
*C22B 3/00* (2006.01)

(52) U.S. Cl.
CPC ............ *C22B 23/06* (2013.01); *C22B 23/043* (2013.01); *C22B 23/0461* (2013.01)

(58) Field of Classification Search
CPC ... C22B 23/06; C22B 23/043; C22B 23/0461; C22B 3/26; C22B 3/42; Y02P 10/20

USPC ........................................................ 75/430
See application file for complete search history.

(56) References Cited

U.S. PATENT DOCUMENTS

| | | | |
|---|---|---|---|
| 2,805,937 A | | 9/1957 | Bennedsen et al. |
| 2,916,357 A | * | 12/1959 | Schaufelberger ......... C22B 3/06 423/633 |
| 3,775,099 A | | 11/1973 | Coffield et al. |

(Continued)

FOREIGN PATENT DOCUMENTS

| | | | |
|---|---|---|---|
| CN | 109628738 A | * | 4/2019 |
| CN | 109628738 A | | 4/2019 |

OTHER PUBLICATIONS

CN-109628738-A Transation (Year: 2019).*

(Continued)

*Primary Examiner* — Brian D Walck
*Assistant Examiner* — Danielle Carda
(74) *Attorney, Agent, or Firm* — Borden Ladner Gervais LLP; Brandon L. Evenson (57) ABSTRACT

Processes and methods for refining ferronickel alloy, and producing nickel sulfate or other nickel product, are provided, where the ferronickel alloy is treated with an oxidizing leach. The oxidizing leach may be, for example, a pressure oxidation (POX) leach or a leach with peroxide or copper (II) ions. The treatment may be in the presence of added copper, such as by providing a copper sulfate solution. Producing nickel sulfate may comprise removing copper and iron after the leach, removing impurities, and either crystallizing the nickel sulfate or precipitating/winning another nickel product.

27 Claims, 2 Drawing Sheets

(56) References Cited

U.S. PATENT DOCUMENTS

| | | | | | |
|---|---|---|---|---|---|
| 3,992,270 | A | * | 11/1976 | Lemarinel | C22B 23/0438 |
| | | | | | 423/493 |
| 4,093,526 | A | * | 6/1978 | Blanco | C22B 23/043 |
| | | | | | 75/718 |
| 4,452,762 | A | | 6/1984 | Fugleberg et al. | |
| 5,399,322 | A | * | 3/1995 | Coltrinari | C22B 23/043 |
| | | | | | 423/150.2 |

OTHER PUBLICATIONS

International Search Report and Written Opinion for International Application No. PCT/CA2022/050003, dated Apr. 12, 2022.

* cited by examiner

FERRONICKEL ALLOY DIRECT REFINING PROCESSES AND PROCESSES FOR PRODUCING NICKLE SULFATE OR OTHER NICKEL PRODUCTS

CROSS-REFERENCE TO RELATED APPLICATIONS

This application claims priority to each of U.S. Provisional Patent Application 63/166,692, filed Jan. 4, 2022, and PCT application PCT/CA2022/050003 filed Jan. 4, 2022; the contents of each of which is incorporated herein by reference in its entirety.

FIELD

The present disclosure relates to direct refining of ferronickel alloy.

BACKGROUND

Ferronickel (FeNi) alloy is normally used to make stainless steel. A shortage of nickel sulfate, which is utilized for production of lithium ion batteries, is forecast by the mid 2020's.

BRIEF DESCRIPTION OF THE FIGURES

Embodiments of the present disclosure will now be described, by way of example only, with reference to the attached Figures.

DETAILED DESCRIPTION

The present disclosure provides a process for refining ferronickel alloy wherein the ferronickel alloy is treated with an oxidizing leach. The treatment may be in the presence of copper or peroxide. In an embodiment, a process for directly refining ferronickel to provide nickel sulfate or other valuable nickel products is provided. In one or more embodiments, there is provided a process for refining ferronickel alloy wherein the ferronickel alloy is treated with a pressure oxidation (POX) leach, optionally in the presence of added copper. In one or more embodiments, there is provided a process for refining ferronickel alloy wherein the ferronickel alloy is leached in the presence of peroxide. It will be understood that other methods of leaching may be used, in the presence or absence of copper, without departing from the spirit of the invention. For example, copper may be provided during a ferronickel alloy leaching process. The ferronickel alloy may be treated with POX in the presence of added copper. The ferronickel alloy may be treated with a direct acid leach in the presence of added copper. The ferronickel alloy may be treated with a heap leach in the presence of added copper. The ferronickel alloy may be feedstock originally intended for use in making stainless steel. The ferronickel alloy may be any suitable feedstock material containing iron and nickel such as ferronickel alloy produced from saprolite feedstock. The ferronickel alloy may be treated in a vessel (such as a column) in the presence of copper. The ferronickel alloy may be treated with a column leach in the presence of hydrogen peroxide and sulfuric acid, optionally in the presence of added copper.

Ferronickel alloys which contain little copper may benefit from an augmented copper content for accelerating leaching, such as in an oxidizing leach.

In one or more embodiments, copper may be added as a first fill reagent. The added copper can be dissolved in the POX leach and then cemented out. The copper may be cemented out on a fraction of the ferronickel alloy added after the POX leach. The cemented out copper may be recycled back to the POX leach.

In one or more embodiments, copper may be added continuously to the process. The added copper may be in the form of copper concentrate or copper sulfate solution. The added copper may be in the form of a copper-containing stream from a copper plant. The added copper may subsequently be removed and recovered by any suitable method, such as via a solvent exchange step or other means such as electrowinning and/or cementation and/or sulfidation and/or ion exchange.

In one or more embodiments, the copper added to the process is added as copper concentrate, such as copper sulfide or copper oxide concentrate, or as copper sulfate or any other suitable copper rich material. In one or more embodiments, the copper added to the process may be processed in a pre-leach step, such as a POX leach, an atmospheric pressure leach, or a roasting step, to increase its solubility.

In one or more embodiments, a portion of the discharge liquor of the oxidizing leach containing soluble copper may be returned to the oxidizing leach, such as to a POX autoclave. The discharge liquor may be returned to the oxidizing leach to provide soluble copper to react, and/or to provide cooling liquor.

In one aspect, the present disclosure provides an improved method of direct refining ferronickel alloy, the improvement comprising adding copper to the ferronickel alloy in a leaching step, such as a pressure oxidation (POX) leach.

In one aspect, the present disclosure provides a process for producing nickel sulfate, or nickel battery material or intermediate feedstock for same, comprising treating a ferronickel alloy feedstock with an oxidizing leach, such as a pressure oxidation (POX) leach in the presence of added copper, removing the copper and iron, removing other impurities, and crystallization of the nickel sulfate or precipitation/winning of another nickel product.

In one aspect, the present disclosure provides a process for producing nickel products from ferronickel that minimizes residues and environmental impact by generating a useable hematite product for iron, a saleable potassium sulfate product for sulfate and a combined concentrated impurity stream to be used as an input for other metallurgical processes.

Unless defined otherwise, all technical and scientific terms used herein have the same meaning as commonly understood by one of ordinary skill in the art to which this invention belongs.

As used in the specification and claims, the singular forms "a", "an" and "the" include plural references unless the context clearly dictates otherwise. The term "comprising" as used herein will be understood to mean that the list following is non-exhaustive and may or may not include any other additional suitable items, for example one or more further feature(s), component(s) and/or ingredient(s) as appropriate.

Ferronickel Alloy Leaching and Refining

Herein are provided processes and methods for refining ferronickel alloy wherein the ferronickel alloy is treated with an oxidizing leach. The oxidizing leach may be in the presence of copper. In one or more embodiments, the ferronickel alloy is treated with a pressure oxidation (POX) leach in the presence of copper.

Refining the ferronickel alloy may include treating the ferronickel alloy in the presence of peroxide. Treating the ferronickel alloy may be in the presence of sulfuric acid. In one or more embodiments, the ferronickel alloy is treated at atmospheric pressure in a vessel, such as a column (which may be referred to as a column leach). The treatment may occur in the presence of peroxide, such as hydrogen peroxide, and sulfuric acid. The treatment may occur in the presence of copper. The treatment may occur in the presence of peroxide and copper. The treatment may occur in the presence of hydrogen peroxide, sulfuric acid, and copper.

The ferronickel alloy may have been previously pre-treated, or the process or method may include a pre-treatment step. A pre-treatment step may include particle size reduction, such as atomization or granulation. It will be understood that any suitable pre-treatment step may be used. For example, if the oxidizing leach is a POX leach, then particle size reduction may be preferred, whereas if the oxidizing leach is a leach in the presence of peroxide and sulfuric acid, then particle size reduction may not be required.

The oxidizing leach may provide a discharge liquor, and at least a portion of the discharge liquor may be recycled. For example, the discharge liquor may be returned to the oxidizing leach. Refining the ferronickel alloy may include both a peroxide treatment and a POX treatment. In such a case, the peroxide treatment may include treating the ferronickel alloy in the presence of peroxide to provide a first discharge liquor, and the POX treatment may include treating the first discharge liquor with POX to provide a second discharge liquor. In such a case, one or both of the first and second discharge liquors may be recycled. For example, the POX discharge liquor (the second discharge liquor) may be returned to the peroxide treatment or to the POX treatment. Recycling of the discharge liquor (such as the POX discharge liquor) may assist the leach circuit to reduce acid consumption and/or increase nickel concentration in the discharge liquor.

As used herein, "pressure oxidation" (POX) may be used interchangeably with pressure oxidation leach or pressure oxidation reaction. Pressure oxidation may be carried out in the presence of oxygen and sulfuric acid. Pressure oxidation may be carried out at any suitable temperature and pressure. Pressure oxidation may be carried out for any suitable length of time. POX may be carried out in an autoclave. POX may be used to leach ferronickel alloy. POX may be used to produce an iron product, such as hematite. POX may be used to refine a ferronickel alloy (such as a ferronickel alloy in the form of an iron/nickel rich pregnant leach solution), thereby producing hematite and a discharge liquor containing dissolved nickel. POX may be used to refine a ferronickel alloy before or after an additional oxidizing leach, such as a leach in the presence of peroxide. For example, a ferronickel alloy may be refined by an oxidizing leach in the presence of peroxide and sulfuric acid, and additionally refined by POX. The discharge liquor from a pressure oxidation step may be referred to as the POX discharge liquor, or second discharge liquor (in embodiments where a first discharge liquor is defined). The POX discharge liquor may be a solution or a slurry. If the POX discharge liquor is a slurry, the slurry may be treated using solid/liquid separation, such as with thickening and/or filtration technologies. The POX discharge liquor may be used directly or treated (e.g. by solid/liquid separation) to provide a pregnant leach solution containing nickel, iron, and other impurities. If the POX discharge liquor is treated by solid/liquid separation, it may also provide a solid phase or thickened slurry containing hematite and other insoluble components.

As used herein "oxidizing leach" can include any suitable leaching conditions to leach the ferronickel alloy, to solubilize at least a portion of the ferronickel alloy such that a nickel and/or iron product can be obtained therefrom. The oxidizing leach may be a pressure oxidation. The oxidizing leach may be done atmospherically, such as by a leach in a vessel in the presence of at least one oxidizing agent. The at least one oxidizing agent may include peroxide, such as hydrogen peroxide. In one or more embodiments, the oxidizing agent includes hydrogen peroxide and sulfuric acid. The at least one oxidizing agent may include copper, with or without additional oxidizing agents, such as peroxide. The vessel may be a column. The oxidizing leach may be carried out with or without added copper. In one or more embodiments, copper is added to the oxidizing leach, such as to a POX leach or a column leach. The oxidizing leach may provide a discharge liquor. A portion of the discharge liquor may be returned to the oxidizing leach. The oxidizing leach may include iron precipitation or hematite production. The discharge liquor from the oxidizing leach may be further treated, such as with solids removal, copper cementation, iron removal, nickel sulfate production, nickel hydroxide production, or other purifying/pre-treatment steps, and/or by the inclusion of further steps herein disclosed.

As used herein "oxidizing leach" can include treating a ferronickel alloy or pre-treated ferronickel alloy solid or solution in the presence of copper. An oxidizing leach in the presence of copper (such as in the form of sulphide, oxide, or sulphate, for example) may be referred to as a "copper treatment". The copper treatment may be the only oxidizing leach step, or in addition to additional oxidizing leach steps. In one or more embodiments, the copper treatment is a column leach process. The copper treatment may occur in a single stage or multiple stages. If the copper treatment is carried out in multiple stages, each stage may vary in pH and/or oxidation reduction potential (ORP) to suitable levels. In such a case, the ferric ions, Fe(III), may be converted partially or fully into ferrous ions Fe(II), by adding reducing agents such as ferronickel alloy particles and/or sulfur dioxide ($SO_2$) prior to the POX treatment for hematite production. In one or more embodiments, the process includes a copper treatment to provide a first discharge liquor. The first discharge liquor may be returned to the copper treatment, such that the copper treatment is carried out in multiple stages. The first discharge liquor may be provided to a POX treatment, in which case the POX treatment may be to further leach the ferronickel alloy and/or to precipitate hematite, to provide a second discharge liquor. The second discharge liquor may be returned upstream, such as to an oxidizing leach step. In one or more embodiments, the second discharge liquor may be returned to a copper treatment step. The second discharge liquor may be further treated, such as to crystallize nickel sulfate therefrom. The processes and methods described herein may include a copper treatment step, such as those described above, or the copper treatment step may be omitted. It will be understood that the process or method may include another form of oxidizing leach step, such as a peroxide treatment or POX treatment, and the oxidizing leach step may be carried out in the presence or absence of added copper.

As used herein "peroxide treatment" can include treating a ferronickel alloy or pre-treated ferronickel alloy solid or solution in the presence of peroxide. The peroxide treatment may be in the presence of hydrogen peroxide and sulfuric acid. In one or more embodiments, the peroxide treatment is a column leach process, and may instead be referred to as a column leach. The peroxide treatment may be carried out in one stage or multiple stages. If the peroxide treatment is carried out in multiple stages, each stage may vary in pH and/or oxidation reduction potential (ORP) to suitable levels. In such a case, the ferric ions, Fe(III), may be converted partially or fully into ferrous ions Fe(II), by adding reducing agents such as ferronickel alloy particles and/or sulfur dioxide ($SO_2$) prior to the POX treatment for hematite production. In one or more embodiments, the process includes a peroxide treatment to provide a first discharge liquor. The first discharge liquor may be returned to the peroxide treatment, such that the peroxide treatment is carried out in multiple stages. The first discharge liquor may be provided to a POX treatment, in which case the POX treatment may be to further leach the ferronickel alloy and/or to precipitate hematite, to provide a second discharge liquor. The second discharge liquor may be returned upstream, such as to an oxidizing leach step. In one or more embodiments, the second discharge liquor may be returned to a peroxide treatment step to recycle the acid. The second discharge liquor may be further treated, such as to crystallize nickel sulfate therefrom.

In one or more embodiments, the copper present in a leaching step may be cemented out after the leaching treatment. The copper formed in a copper cementation step may be used elsewhere in the process or method. In one or more embodiments, the copper formed in a copper cementation step may be recycled back to a leaching step, such as an oxidizing leach. It will be understood that copper may be removed in any suitable manner, such as by cementation, solvent exchange, electrowinning, sulfidation, and/or ion exchange.

As used herein "copper cementation" may refer to a process of precipitating solubilized copper ions.

In one or more embodiments, the process or method includes iron removal.

As used herein "iron removal" may refer to a process of precipitating solubilized iron ions or an ion exchange process. For example, an iron removal process may include precipitation of iron to form hematite. The processes herein disclosed may include a hematite production step. The hematite production step may be the POX process. The process may include an oxidizing leach step and a hematite production step, however, it will be understood that the two steps may occur simultaneously. For example, the process may include a POX treatment to both leach the ferronickel alloy and form hematite to remove iron. In one or more embodiments, the process may include an oxidizing leach such as a peroxide treatment to leach the ferronickel alloy, and such a process may further include a separate hematite production step, such as a POX treatment, to precipitate the dissolved iron and form hematite. The hematite production step may include forming basic ferric sulfate. Basic ferric sulfate may be solubilized, such as under acidic conditions, and re-dissolved, for example, during flashing. The processes herein disclosed may include iron by-product generation. The process may include iron by-product generation instead of, or in addition to, hematite production. Iron by-products may include jarosite or goethite. Iron by-product generation may depend upon the conditions and other steps in the process.

In one or more embodiments, the process as described herein comprises refining an aqueous solution comprising nickel sulfate (e.g., a sulfate-matrix, pregnant leach solution (PLS)), where the PLS is subjected to any one or combination of refining stages (also referred to herein as impurity or component removal stages) to remove specific impurities or components. The terms pregnant leach solution (PLS) and discharge liquor (e.g. discharge liquor of the oxidizing leach, or POX discharge liquor) may be used interchangeably herein to refer to an aqueous solution comprising nickel sulfate. Any suitable solution comprising nickel sulfate may be used for further refining, such as for crystallizing nickel sulfate.

Following leaching, the PLS may undergo one or more refining stages to refine the PLS by removing one or more impurities or components. The type and amount of impurities or components to be removed is dependent, at least in part, on the type of feedstock from which the PLS is formed, as well as the specifications for the final product to be generated by the process (e.g., purity, grade nickel sulfate ($NiSO_4$)). Examples of impurities or components to be removed include, but are not limited to, sodium (Na), aluminum (Al), iron (Fe), copper (Cu), zinc (Zn), lithium (Li), cobalt (Co), and manganese (Mn). When battery-grade nickel sulfates are required, there are specific product specifications (e.g., limits) for such impurities that are tolerated for; and any such impurities that are present in a process' feedstock, water, or reagents in an amount that exceeds said product specification would need to have their concentration reduced.

There are many suitable methods for removing impurities or components from the PLS. Such methods include, but are not limited to precipitation, atmospheric or pressure leaching, sulfidation, solvent extraction, ion exchange, and cementation. Selecting the appropriate method (and operational conditions thereof) depends, at least in part, on the type and amount of impurities or components to be removed, as well as the specifications for the final product generated by the process. For example, copper may be removed via precipitation, solvent extraction, sulfidation, cementation, or ion exchange, etc.; iron and aluminum may be removed via precipitation, or ion exchange, etc.; zinc may be removed via sulfidation, solvent extraction, or ion exchange, etc.; and cobalt may be removed via solvent extraction, ion exchange, or oxidative precipitation etc. The conditions and operational parameters for each method are generally known and can be selected depending on the type and amount of impurity or component to be removed.

For example, cementation is a process involving a redox reaction between a first metal ion and a first solid metal, whereby the first metal ion is reduced to a second solid metal, and the first solid metal is in turn oxidized to a second metal ion. Cementation may be selected for removing, e.g., copper because it can add value metals to the process (for example, by adding Ni if nickel powder is used as the first solid metal) without the use of other reagents; and/or because it can allow removal of impurities (for example, by reduction) without having to add acid or base reagents to the process.

The refining stages for removing impurities or components from the PLS may be selected to minimize use of acid or base reagents. For example, Cu can be removed via cementation with nickel powder, which requires little acid and no base, and generates no acid; in contrast, removal of Cu by solvent extraction (SX) requires one mole of sulfuric acid per mole of Cu removed, and all of said added acid needs to be neutralized by a base downstream. In another example, Cu can be removed via cementation with ferronickel feed particles through single or multiple stage columns, or granulated/atomized ferronickel materials in a vessel (such as a tank). Other impurities such as Fe and Al can be removed via precipitation by raising the pH (e.g., to about 5.5), which requires added base but no added acid; base which can be introduced as an external neutralizing agent, or as a basic metal salt generated downstream in the process. In contrast, removal of Fe and Al by ion exchange (IX) requires added base to load the Fe and Al onto the exchange column, and it also requires added acid to strip the Fe and Al off the exchange column, and additional reagents or process steps to convert those impurities to a disposable form.

Production of Nickel Products

In one or more embodiments, the process or method includes crystallization of nickel sulfate or precipitation/winning of another nickel product.

In one or more embodiments, the leaching (and refining) of the ferronickel alloy results in a nickel sulfate solution or solid, (e.g., a sulfate-matrix, pregnant leach solution (PLS) or POX discharge liquor). The aqueous solution comprising nickel sulfate may be crystallized to form a crystallized nickel sulfate, such as battery-grade nickel sulfate. In one or more embodiments, there may be provided a process for generating metal sulfate, such as nickel sulfate or nickel and cobalt sulfate. In one or more embodiments there may be provided a process for generating nickel sulfate, the process comprising: crystallizing nickel sulfate from an aqueous solution to form a crystallized nickel sulfate in a mother liquor, the mother liquor comprising an uncrystallized nickel sulfate; separating the crystallized nickel sulfate from the mother liquor. The process may further include basifying a portion of the mother liquor to convert the uncrystallized nickel sulfate to a basic nickel salt. The basic nickel salt may be nickel hydroxide. The basic nickel salt may be used upstream of crystallizing the nickel sulfate.

In one or more embodiments of the process described herein, using the basic nickel salt upstream may comprise converting the basic nickel salt back to the uncrystallized nickel sulfate. Converting the basic nickel salt back to the uncrystallized nickel sulfate may comprise using the basic nickel salt as a first neutralizing agent to neutralize acid upstream of crystallizing the nickel sulfate. Basifying the portion of the mother liquor to convert the uncrystallized nickel sulfate to the basic nickel salt may further comprise: bleeding the mother liquor and controlling the bleed rate to produce an amount of the basic nickel salt that is at least approximately equivalent to an amount of the acid to be neutralized upstream of crystallizing the nickel sulfate. Using the basic nickel salt as the first neutralizing agent may comprise using the basic nickel salt as the first neutralizing agent in a leaching stage; or comprises using the basic nickel salt as the first neutralizing agent in a refining stage.

In one or more embodiments of the process described herein, basifying the portion of the mother liquor may comprise using a second neutralizing agent to convert the uncrystallized nickel sulfate to the basic nickel salt. The second neutralizing agent may be sodium hydroxide, and the sodium hydroxide may be converted to sodium sulfate when converting the uncrystallized nickel sulfate to the basic nickel salt. The process may further comprise converting the sodium sulfate back to the sodium hydroxide by electrolysis. The second neutralizing agent may be any one or combination of potassium hydroxide, calcium hydroxide, lithium hydroxide, or magnesium oxide. Using any one or combination of potassium hydroxide, calcium hydroxide, lithium hydroxide, or magnesium oxide may forms any one or combination of potassium sulfate, calcium sulfate, lithium sulfate, or magnesium sulfate as a by-product.

In one or more embodiments of the process described herein, the process may further comprise crystallizing the uncrystallized nickel sulfate. Crystallizing the nickel sulfate may further comprise bleeding the mother liquor and controlling the bleed rate to selectively inhibit crystallizing an impurity when crystallizing the nickel sulfate. Crystallizing the nickel sulfate may further comprise controlling an amount of free water in the crystallizer to selectively inhibit crystallizing an impurity when crystallizing the nickel sulfate. Controlling the amount of free water may comprise controlling the rate of water evaporation from the crystallizer, or controlling the addition of water to the crystallizer. The impurity may comprise lithium, sodium, potassium, magnesium or ammonium. In this context, an "impurity" refers to a component of a feedstock that is not a nickel sulfate as described herein, or does not contribute to formation of a nickel sulfate or crystallized nickel sulfate as described herein. As used herein, an "impurity", once isolated from a feedstock, may be a useful, valuable, or desirable material.

In one or more embodiments of the process described herein, the process may further comprise isolating the basic nickel salt from the mother liquor. Isolating the basic nickel salt may comprise using a one-stage or two-stage precipitation circuit and selectively precipitating the basic nickel salt. The basic nickel salt may comprise a nickel hydroxide.

In one or more embodiments of the process described herein, the crystallized nickel sulfate may be a battery-grade crystallized nickel sulfate, or an electroplating-grade crystallized nickel sulfate. Of the crystallized nickel sulfates isolated from the process, some may be nickel sulfate hydrates (e.g., crystallized nickel sulfates and water molecules combined in a variety of ratios as an integral part of the crystal; for example, a ratio of one water molecule per nickel sulfate, or six water molecules per nickel sulfate, or seven water molecules per nickel sulfate).

In one or more embodiments, the process as described herein may further comprise refining the aqueous solution comprising the nickel sulfate (e.g., a sulfate-matrix, pregnant leach solution (PLS)), where the PLS is subjected to any one or combination of refining stages (also referred to herein as impurity or component removal stages) to remove specific impurities or components such as: Cu (e.g., via sulfidation, solvent extraction, cementation, ion exchange, etc.), Fe and Al (e.g., via precipitation, ion exchange, etc.), Zn (e.g., via sulfidation, solvent extraction, ion exchange, etc.), Co (e.g. via solvent extraction, ion exchange, precipitation etc.), Ca (e.g. via solvent extraction, ion exchange, etc.), or Mg (e.g. via solvent extraction, ion exchange etc.). The refined PLS may then be introduced into a crystallizer under conditions sufficient to selectively crystalize nickel sulfate ($NiSO_4$) from the refined PLS to produce crystallized nickel sulfates in a mother liquor (e.g., via a forced circulation crystallizer under vacuum, etc., against lithium, magnesium, sodium, potassium or ammonium depending on the feedstock). These crystallized nickel sulfates are then isolated from the mother liquor (e.g., discharged from the crystallizer). If one crystallization cycle (e.g., using one crystallizer) is insufficient to produce crystallized nickel sulfates (which may occur, e.g., with feedstocks containing higher concentrations of impurities), the crystals discharged from the crystallizer may be dissolved in pure water to form aqueous sulfate solutions before being introduced into a second crystallization cycle (e.g., using a second crystallizer) to be recrystallized.

After crystallization, the mother liquor may contain undesired salts/metals (e.g., $Li_2SO_4$, $MgSO_4$, $Na_2SO_4$, $CoSO_4$, $(NH_4)_2SO_4$, $K_2SO_4$ etc.), as well as nickel sulfates that did not crystallize out of solution (also referred to herein as the uncrystallized nickel sulfate). To selectively recover these uncrystallized nickel sulfates from the remaining undesired materials in solution, the mother liquor is bled from the crystallizer(s), and basified to convert the uncrystallised nickel sulfates into basic nickel salts, such as nickel hydroxides ($Ni(OH)_2$). These nickel hydroxides may be used upstream to neutralize acids introduced during the leaching that formed the PLS and/or the refining stages of the process, thus converting the nickel hydroxides back to nickel sulfates that can then be isolated via crystallization. Prior to use upstream, the nickel hydroxides may be isolated from the mother liquor and washed, and may be reslurried with water for transfer, which can limit exposure to air and thus limit oxidation of the hydroxides.

In addition to, or instead of, using the nickel hydroxides as neutralizing agents, the process may use external sources of neutralizing agents (e.g., added oxides, hydroxides) to basify the mother liquor coming out of the crystallizer, and optionally to neutralize acids introduced during leaching and/or the refining stages. These external neutralizing agents are selected either for their capacity to be regenerated from their waste product (e.g., via electrolysis, etc.), to minimize or avoid forming waste streams (e.g., $CaO/CaCO_3$ as agents, $CaSO_4 \cdot 2H_2O$ as waste product; NaOH as agent, $Na_2SO_4$ as waste product); or for their capacity to generate higher valued by-products (e.g., KOH as agent, $K_2SO_4$ as by-product).

Figure 1:
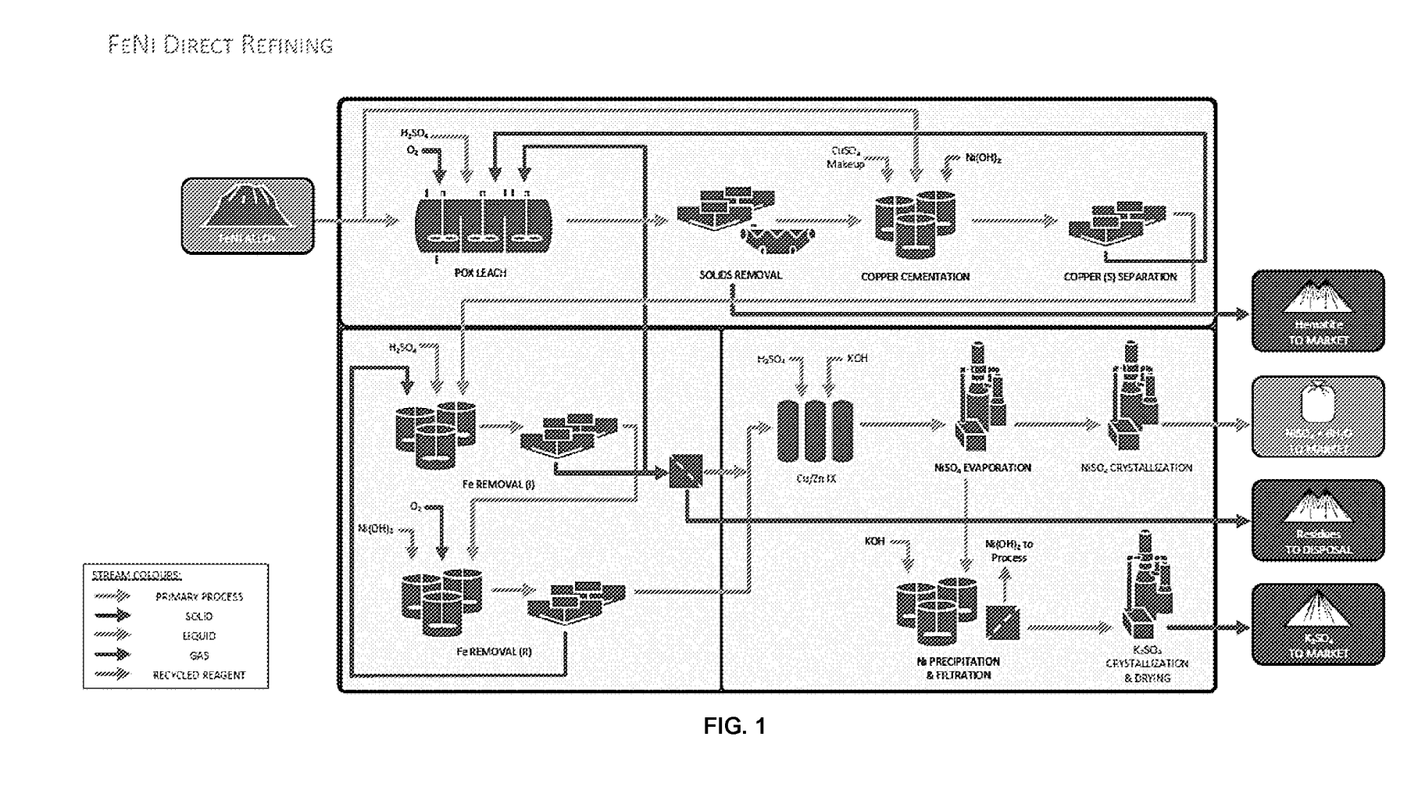
FIG. 1 is a schematic diagram of a process for ferronickel (FeNi) direct refining according to an embodiment of the present disclosure.
Figure 2:
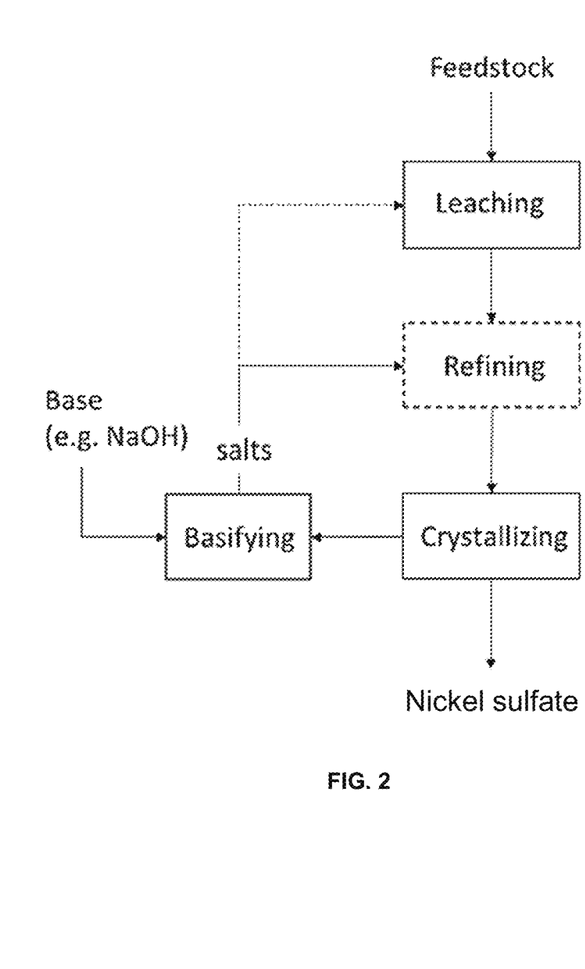
FIG. 2 is a flow diagram of a general process for generating crystallized nickel sulfate.

In one or more embodiments of the present disclosure, there is provided a process as depicted in FIG. 1 or FIG. 2, or as described in Example 1. In one or more embodiments of processes and methods of the present disclosure, there is provided a treatment as depicted in FIG. 2, wherein: the leaching and refining steps comprise pre-treating a ferronickel alloy feedstock as described herein to form a pre-leached feedstock, and subjecting the pre-leached feedstock to leaching and refining steps to form a refined, leached solution comprising an uncrystallized nickel sulfate; the crystallizing step comprises introducing the refined, leached solution into a crystallizer and forming a crystallized nickel sulfate in a mother liquor, the mother liquor comprising remaining uncrystallized nickel sulfate, and separating the crystallized nickel sulfate from the mother liquor; and the basifying step comprises basifying a portion of the mother liquor to convert the remaining uncrystallized nickel sulfate to a basic nickel salt; and using the basic nickel salt upstream of crystallizing the nickel sulfate; for example, as a neutralizing agent to neutralize acid upstream of crystallizing the nickel sulfate.

Crystallization

The processes and methods described herein may include crystallizing metal sulfate from an aqueous solution to form a crystallized metal sulfate, such as a nickel sulfate, a cobalt sulfate, or combinations thereof. The aqueous solution, such as a refined PLS, may be introduced into a crystallizer under conditions sufficient to selectively crystalize metal sulfate from solution. Such selective crystallization occurs against components such as lithium, sodium, potassium, magnesium, ammonium that remain in the refined PLS (depending on the feedstock) to provide one or more crystallized metal sulfates in a mother liquor.

Different types of crystallizers may be suitable for affecting the selective crystallization or co-crystallization of metal sulfates, such as nickel sulfate crystallization or nickel and cobalt sulfate co-crystallization. Such crystallizers include, but are not limited to, evaporative crystallizers, forced circulation (FC) crystallizers, indirect force circulation (IFC) crystallizers, and draft tube baffle (DTB) crystallizers. The conditions and operational parameters for such crystallizers can be selected depending on the type and purity of nickel sulfate to be crystallized, and/or the type and concentration of impurities in the PLS. For example, if an IFC or DTB crystallizer is used, coarser crystals may be formed when crystallizing nickel sulfates; this can inhibit the entrainment of impurities during said crystallization, such as lithium, sodium magnesium, and/or potassium. If a forced circulation crystallizer is used, it may be operated under vacuum in order to flash cool the PLS to ambient temperatures (e.g., about 25° C.), which in turn can facilitate water evaporation and metal; sulfate crystallization. In such cases, the amount of free water being evaporated may be less than the amount necessary to reach a saturation point of certain impurities, such as lithium or sodium. When a crystallizer is used to selectively crystallize nickel sulfate against impurities such as lithium and sodium, the crystallizer may be operated at a pH level between 1-5, or between 1.5-2.5. In some embodiments, a pH level less than 0, less than 1.5, or between 0.5-1.5 is effective.

The conditions and operational parameters of the crystallizer may be selected to selectively crystallize nickel sulfate over other sulfates and components (e.g. impurities) in solution. The conditions and operational parameters of the crystallizer may be selected to selectively co-crystallize nickel and cobalt sulfates over other sulfates and components (e.g. impurities) in solution. The conditions and operational parameters for the crystallizer may also be selected to manage the purity of the crystallized metal sulfates. Bleeding the mother liquor from the crystallizer during crystallization, and the rates at which the bleeding occurs, can impact the purity of the crystallized nickel sulfates; for example, by selectively inhibiting crystallization of impurities. As used herein, selecting a bleed rate to selectively inhibit crystallization of a specific impurity means to set a crystallizer bleed rate, within a range of possible bleed rates that inhibits the crystallization of the specific impurity more so than it would inhibit crystallization of a different impurity. The bleed rate may be selected such that it maximizes inhibiting crystallization of the specific impurity. The impurities may be sodium, potassium, magnesium, etc. Using a higher bleed rate of the mother liquor helps to maintain lower concentrations of impurities and other components in the mother liquor that could impact the purity of the crystallized nickel sulfates.

Further, impurity solubility can be temperature dependent; therefore, selecting the crystallizer temperatures as well as the crystallizer bleed rates can be effective in managing the purity of the metal sulfate(s) being crystallized.

Impurity solubility can also be dependent on the amount of free water present in the PLS and/or mother liquor; therefore, managing water levels in the crystallizer can be an effective means of managing the purity of the metal sulfate(s) being crystallized. For example, in some instances, the metal sulfates crystallize out of solution as metal-sulfate hydrates (i.e., crystallized metal sulfates and water molecules combined in a definite ratio as an integral part of the crystal), which reduces the concentration of water in the mother liquor. By decreasing the concentration of free water, the concentration of impurities (e.g. lithium, sodium, potassium, magnesium, etc.) in the mother liquor may also increase to the point that they crystallize out of solution and impact the purity of the crystallized metal sulfates. However, if a sufficient amount of water is added to the PLS and/or mother liquor when in the crystallizer, or if that amount of excess water remains in the PLS after upstream treatment (e.g., at least as much water as is expected to be lost due to hydrate formation), the presence of that free water can inhibit the crystallization of impurities out of solution.

The crystallized metal sulfates, such as nickel sulfates, or nickel and cobalt sulfates, may be isolated from the mother liquor by discharging them from the crystallizer. For example, the crystallized metal sulfates may be discharged as a slurry that is passed to a filter or centrifuge to separate the crystals from the mother liquor. The filtrate or concentrate (i.e., mother liquor) may then be passed back to the crystallizer, or a fraction of it may be bled; and the isolated crystals may be washed on the filter or centrifuge and dried. In some instances, using only one crystallizer is insufficient to produce suitably pure, crystallized metal sulfates, such as when the PLS is formed from dirtier feedstocks. Crystals discharged from a first crystallizer may then be dissolved in water (e.g., pure water) before being introduced into a second crystallizer to be recrystallized and further purified.

In some embodiments, the process described herein may help reduce capital and operating costs by using a crystallizer to isolate crystallized metal sulfates, in place of solvent extraction circuits. While crystallization requires energy input, it does not require use of added reagents, thereby helping reduce operating costs. Further, the capital costs associated with crystallization are lower than those associated with solvent extraction circuits.

In other embodiments, the process described herein reduces capital and operating costs by reducing reagent use. For example, a nickel solvent extraction circuit to form nickel sulfate requires the consumption of 1 mole of sulfuric acid and 2 moles of sodium hydroxide per mole of nickel sulfate produced. In contrast, crystallization does not require the use of any added reagents. The process described herein may help reduce reagent use even if a solvent extraction step is used as part of the refining stage, as said solvent extraction will generally experience a smaller load (i.e., impurities at lower concentrations), and so will require less acid and base. In some embodiments, the process described herein may help reduce capital and operating costs by reducing the number of processing steps. Reducing the number of process steps not only reduces capital and operating costs, it also reduces the complexity of the process, and therefore reduces the complexity of the infrastructure and skillsets needed to conduct the process. For example, solvent extraction is a relatively complex unit operation requiring multiple stages of extraction, scrubbing, and stripping; and requiring systems for treatment of aqueous discharge streams, crud removal, organic vapor recovery, and fire protection. By using a crystallizer to isolate crystallized nickel sulfates, in place of solvent extraction circuits, such process complexity (and associated costs) may be reduced or avoided altogether.

In other embodiments, the process described herein may help increase the yield of crystallized metal sulfates by reducing or preventing the addition of specific impurities or components in the leaching and/or refining stages of the process, such as lithium, sodium, potassium, or magnesium. For example, as the one-pass yield of crystallized nickel sulfates increases in the crystallizer, the concentrations of impurities such as lithium, sodium, etc. in the mother liquor may also increase. As a result, the crystallizer bleed rate must also increase to manage the purity of the crystallized nickel sulfates (for example, by inhibiting or preventing the impurities from approaching their saturation concentrations in the mother liquor). However, increasing the crystallizer bleed rate may create inefficiency, as the bled uncrystallised nickel sulfates will be basified and precipitated, consuming reagents. As such, reducing or preventing the addition of these impurities in the leaching and/or refining stages of the process means the crystallizer may be able to be operated at a lower bleed rate while avoiding co-crystallization of impurities with the nickel sulfates, which can improve the one-pass yield of crystallized nickel sulfates while also decreasing operational costs. In one or more embodiments of the process of the present disclosure, the addition of specific impurities (e.g., lithium, sodium, magnesium, etc.) may be reduced or prevented by using the basic metal salts (e.g., the metal hydroxides $Ni(OH)_2$, $Co(OH)_2$, $Mn(OH)_2$, etc.) precipitated from the mother liquor that is bled from the crystallizer. In some embodiments, precipitation and washing of the basic metal salts may be carefully controlled (e.g., by selection of pH levels, use of two-stage precipitation circuits, etc.) to reduce or prevent precipitating impurities (e.g., lithium, sodium, magnesium, etc.) into the basic metal salts.

In some embodiments, the process described herein may increase yield of crystallized nickel sulfates by using a loop of isolating and basifying crystallization mother liquors to convert uncrystallised nickel sulfates in solution to basic nickel salts (e.g., nickel hydroxides), and using those basic nickel salts as neutralizing agents to convert the salts back to nickel sulfates for crystallization. The iterative nature of the loop may help ensure a good recovery of crystallized nickel sulfates.

In other embodiments, the process described herein may reduce or eliminate sodium sulfate as a waste stream by regenerating sodium hydroxide from sodium sulfate. Sodium sulfate is a by-product with a marketability that is generally concerned to be poor, with the potential to be a costly waste issue, both from an environment and financial standpoint.

Basification

The processes and methods described herein may include basifying a portion of the mother liquor. Basifying a portion of the mother liquor may be to convert an uncrystallized metal sulfate to a basic metal salt. Basifying a portion of the mother liquor may be to convert an uncrystallized metal sulfate (such as nickel sulfate or nickel and cobalt sulfate) to a basic metal salt (such as nickel hydroxide or nickel and cobalt hydroxide). Basifying a portion of the mother liquor may be to convert an uncrystallized nickel sulfate to a basic nickel salt, such as nickel hydroxide. In one or more embodiments of the process described herein, the process may comprise basifying the portion of the mother liquor using a second neutralizing agent to convert the uncrystallized nickel sulfate to the basic nickel salt. In one or more embodiments, converting the basic nickel salt back to the uncrystallized nickel sulfate may comprise using the basic nickel salt as a first neutralizing agent to neutralize acid upstream of crystallizing the nickel sulfate.

The crystallization mother liquor contains uncrystallised metal sulfates (such as nickel or nickel and cobalt), in addition to other impurities and components, like salts and metals such as $Li_2SO_4$, $Na_2SO_4$, etc. It will be understood that the discussion of nickel sulfates that follows may also apply to other metal sulfates, such as nickel and cobalt sulfates. To selectively recover these uncrystallised nickel sulfates and to form basic nickel salt(s) for use up-stream as neutralizing agents (also referred to herein as first neutralizing agents), the mother liquor may be bled from the crystallizer and basified in order to convert the uncrystallised nickel sulfates remaining in the mother liquor to said basic nickel salts, such as nickel hydroxide ($Ni(OH)_2$). When basifying the mother liquor, enough base may be added to increase the pH level to between 7.5-10, or between 7.5-9.5. The resultant nickel hydroxides precipitate from the mother liquor, and may be isolated from the mother liquor via filtration and washed to form a cake, and may be re-pulped to form a slurry. For example, the nickel hydroxides may be recovered by filtration, thickening and filtration, or centrifugation, and then washed on the filter or centrifuge to form the cake. At least a part of the cake may be passed to a re-pulp tank to be slurried using water or process solutions. The nickel hydroxides may be selectively precipitated from the mother liquor; for example, via a one-stage or two-stage precipitation circuit. The precipitation circuits can be used to selectively precipitate the nickel hydroxides from impurities in the nickel hydroxides due to their presence in the mother liquor.

In one or more embodiments, the metal hydroxides (such as nickel and/or cobalt hydroxides) may be introduced up-stream in the process. For example, nickel hydroxide may be used as a neutralizing agent to neutralize acids introduced at the leaching and/or refining stages. For example, about 0% to 40% of the nickel hydroxides (e.g., as a cake) may be introduced into the leaching stage; and about 60% to 100% of the nickel hydroxides (e.g., as a cake) may be introduced into the refining stages. Using the nickel hydroxides as a neutralizing agent reduces and/or eliminates the need to introduce external neutralizing agents; this reduces reagent use (and associated costs), and reduces and/or eliminates additional sources of impurities that may impact product purity (e.g., impurity metal cations from the external neutralizing agent), and would otherwise require the crystallizer bleed rate to be higher to avoid co-precipitation of the impurities and contamination of the crystallized nickel sulfates. In some instances, to help ensure that there is a sufficient amount of basic nickel salts, e.g., nickel hydroxides, available for use as a neutralizing agent, the rate at which the mother liquor is bled from the crystallizer and basified to form the nickel hydroxides may be controlled such that the amount of nickel hydroxides formed is at least approximately equivalent to, or approximately equivalent to the amount of acid introduced at the leaching and/or refining stages. For example, if the refined PLS is of high purity, the crystallizer bleed rate may not need to be very high to manage the purity of the crystallized nickel sulfates (e.g., as described above); however, the crystallizer bleed rate may nonetheless need to be increased to ensure a sufficient amount of nickel hydroxides are formed for use upstream. In other instances, the rate at which the mother liquor is bled from the crystallizer and basified to form the nickel hydroxides may be controlled such that the amount of nickel hydroxides formed in combination with an added amount of external neutralizing agent is at least approximately equivalent to the amount of acid introduced at the leaching and/or refining stages; however, the amount of external neutralizing agent added may be kept sufficiently low such that use of the external neutralizing agent does not introduce impurities (e.g., impurity metal cations) at a concentration that would impact the purity of the crystallized nickel sulfates. In such instances, a combination of the formed nickel hydroxides and external neutralizing agent may be used to manage capital and/or operating costs. Further, the rate at which the nickel hydroxides are metered to an upstream process may be controlled by a pH set point for said process (e.g., leaching, refining, etc.).

Further, using the basic metal salts (e.g., nickel hydroxides) as a neutralizing agent may convert the basic metal salts back to metal sulfates within the refined PLS. The refined PLS, comprising the converted metal sulfates, may then proceed on to the crystallizer, wherein the converted metal sulfates may be crystallized and isolated from the mother liquor. This loop of isolating and basifying the mother liquor to convert uncrystallised metal sulfates in solution to basic metal salts, and using those basic metal salts as neutralizing agents to convert the basic metal salts back to metal sulfates that can then be isolated via crystallization, may help improve the yield of isolated, crystallized metal sulfates obtained from a particular feedstock.

In addition to using the basic metal salts, e.g., nickel hydroxides, as a neutralizing agent, the process may use external sources of neutralizing agents (e.g., added oxides, hydroxides, etc.) in the refining stages to neutralize acids, and/or to basify the mother liquor bleed coming out of the crystallizer (also referred to herein as second neutralizing agents). Selecting the type(s) and amount(s) of external neutralizing agent may depend, at least in part, on the nature of the refining stages, and the type of nickel sulfate and other components in the mother liquor. There are different types of external neutralizing agents that may be suitable for use in the refining stages, and/or for use in basifying the mother liquor. Suitable external neutralizing agents may include, but are not limited to, potassium hydroxide (KOH), calcium hydroxide ($Ca(OH)_2$), sodium hydroxide (NaOH), lithium hydroxide (LiOH), or magnesium oxide (MgO). For example, any one or combination of potassium hydroxide (KOH), calcium hydroxide ($Ca(OH)_2$), sodium hydroxide (NaOH), lithium hydroxide (LiOH), and magnesium oxide (MgO) may be used as an external neutralizing agent. There are types of external neutralizing agents that may be less suitable for use in the refining stages and/or for use in basifying the mother liquor. For example, use of ammonia as an external neutralizing agent may result in the formation of double salts, such as nickel-ammonium sulfate salts, or nickel complexes. Such cations, salts or complexes may make processes less feasible, and/or increase operational and capital costs due to requisite solvent extraction circuits.

The amount of external neutralizing agent may be selected depending on the nature of the refining stages. For example, if there is a high concentration of Cu that needs to be removed in a refining stage, then a high concentration/volume of neutralizing agent may be needed to neutralize any acid generated in a copper solvent extraction stage. Further, if there is a high concentration of Fe that needs to be removed in a refining stage, then a high concentration/volume of neutralizing agent will be needed to increase the pH and remove the Fe by hydrolysis.

The type of external neutralizing agent may be selected to generate and recover, via a salt recovery step, a particular by-product, such as a by-product that has commercial value. For example, if the external neutralizing agent is selected to be potassium hydroxide, then its use may generate potassium sulfate ($K_2SO_4$), a fertilizer. If the external neutralizing agent is selected to be calcium hydroxide, then its use may generate gypsum ($CaSO_4 \cdot 2H_2O$), a product that may be disposed of as waste, or used in dry-wall and construction. If the external neutralizing agent is selected to be magnesium oxide (MgO), then its use may generate magnesium sulfate. If the external neutralizing agent is selected to be lithium hydroxide (LiOH), then its use may generate lithium sulfate.

The type of external neutralizing agent may also be selected based on its ability to be recovered, via a salt recovery step, and regenerated, so that the neutralizing agent can be used in the process, and then regenerated for re-use. For example, if the external neutralizing agent is selected to be sodium hydroxide, then its use may generate sodium sulfate as a by-product. Sodium hydroxide can be regenerated from sodium sulfate via electrolysis. In general, electrolysis can directly convert the by-product sodium sulfate back to sodium hydroxide for re-use in the process, producing sulfuric acid during the conversion. More particularly, electrolysis uses an applied electric potential and one or more ion selective membrane(s) to regenerate an acid and a base from a salt solution, and is conducted using an electrochemical cell that can comprise two or more compartments separated with selective membrane(s). For example, the electrolysis may involve a 3-compartment cell operating under 6V of potential with a current density between 1500-3000 A/m$^2$, which may be able to produce an approximately 20 wt % solution of sodium hydroxide along with an approximately 10 wt % solution of sulfuric acid from sodium sulfate, both of which may be recycled for use upstream in the process. If the external neutralizing agent is selected to be LiOH, then its use may generate lithium sulfate that could be converted back to LiOH using a downstream recovery step such as basification and crystallisation, or electrolysis, or could be converted to lithium carbonate as a saleable product.

In one or more embodiments, the process described herein does not use solvent extraction circuits to isolate battery-grade, crystallized nickel sulfates. In one or more embodiments, the process described herein helps reduce capital and operating costs; increase yield of crystallized nickel sulfates; and/or reduce or eliminates sodium sulfate as a solid waste (when sodium hydroxide is used as an external neutralizing agent, and the sodium sulfate is converted back to sodium hydroxide via electrolysis, or where the amount of external neutralising agent required is reduced).

EXAMPLES

Example 1

FIG. 1 shows a schematic diagram of a FeNi (ferronickel) alloy direct refining process according to an embodiment of the present disclosure. The FeNi alloy is provided to a pressure oxidation (POX) leach, followed by solids removal and then copper cementation. The copper cemented out in the copper cementation step is then recycled back to the POX leach. The copper cemented out in the copper cementation step may be treated with a pre-leach before being recycled back to the POX leach. Further processing steps may include iron removal, and nickel sulfate production. Further processing steps may include crystallization of nickel hydroxide. In one or more embodiments, the process includes further processing to precipitate nickel hydroxide for use upstream in the present process, including in association with copper cementation, and/or iron removal.

In this example, granulated/atomized FeNi particles are provided directly to a POX autoclave for a copper assisted POX leach; leaching and hematite production occur in one unit operation.

Example 2

The process of Example 1 may be carried out with the following modification: instead of the FeNi alloy being treated directly with a pressure oxidation (POX) leach, the FeNi alloy may instead be treated with a leach in a vessel (such as a column) in the presence of peroxide and sulfuric acid.

As an alternative to or a supplement to the copper assisted POX leach described in Example 1 and FIG. 1, hydrogen peroxide can be used as an oxidizing agent in a column leach to dissolve ferronickel in the presence of sulfuric acid. In this example, FeNi alloy shots (having larger particle size than the granulated/atomized FeNi particles of Example 1) are provided to a peroxide/sulfuric acid leach column, thereby leaching the ferronickel in one step. In a second step, the discharge liquor from the leach column is sent to POX to precipitate hematite. In this example, copper was not added to the POX step. In this process, the POX PLS (or second discharge liquor) may be recycled to the peroxide assisted leach circuit to reduce acid consumption and increase nickel concentration. By increasing the nickel concentration, the autoclave operation may allow high acidity and elevated iron throughput. Because the nickel concentration is controlled by the PLS recycle stream, the stability of the autoclave operation condition may be improved. Another advantage of high nickel concentration PLS may be to reduce the downstream flow rate for nickel production, thus helping reduce capital costs.

The recycled ratio of the PLS may be adjusted to reduce the formation of basic sulphates or goethite. The desirable iron product in the process is hematite due to its high iron content, low sulphur content and marketability potential.

Following the oxidizing leach, the examples can be carried out in the same way, including solids removal and then copper cementation (if copper was added to the oxidizing leach). Further processing steps may include those listed above for Example 1.

Example 3

The process of Example 1 may be carried out with the following modification: instead of the FeNi alloy being treated directly with a pressure oxidation (POX) leach, the FeNi alloy may instead be treated with a leach in a vessel (such as a column) in the presence of added copper.

As an alternative to or a supplement to the copper assisted POX leach described in Example 1 and FIG. 1, copper can be used as an oxidizing agent in a column leach to dissolve ferronickel. The added copper may be any suitable source of copper ions, such as a copper sulfate solution. The treatment may be with or without pre-treatment, such as granulation or atomization of the FeNi alloy. The treatment may be carried out as a single stage, or multiple stages. After the treatment, copper may be cemented out in the form of sponges and exit the column. The copper may be recycled. For example, the copper may be returned to a stage of the oxidizing leach or to a direct POX leach process, such as the one of Example 1.

EMBODIMENTS

1. A process for refining ferronickel alloy comprising: treating the ferronickel alloy with an oxidizing leach.
2. The process of embodiment 1, wherein treating the ferronickel alloy with the oxidizing leach comprises treating the ferronickel alloy with a pressure oxidation (POX) leach.
3. The process of embodiment 1 or 2, wherein treating the ferronickel alloy with the oxidizing leach comprises treating the ferronickel alloy in the presence of copper.

4. The process of any one of embodiments 1 to 3, wherein treating the ferronickel alloy with the oxidizing leach comprises treating the ferronickel alloy in the presence of peroxide.
5. The process of any one of embodiments 1 to 4, wherein treating the ferronickel alloy with the oxidizing leach comprises treating the ferronickel alloy in the presence of sulfuric acid.
6. The process of any one of embodiments 1 to 5, wherein treating the ferronickel alloy with the oxidizing leach comprises treating the ferronickel alloy at atmospheric pressure in vessel, such as a column.
7. The process of any one of embodiments 4 to 6, wherein treating the ferronickel alloy with the oxidizing leach comprises:
   providing a peroxide treatment comprising treating the ferronickel alloy in the presence of peroxide and sulfuric acid, to provide a discharge liquor, and
   providing a POX treatment comprising treating the discharge liquor with the POX.
8. The process of any one of embodiments 3 to 7, wherein the copper is provided as copper sulfide, copper oxide, or copper sulfate.
9. The process of any one of embodiments 1 to 8, further comprising:
   pre-treating the ferronickel alloy prior to treating the ferronickel alloy with the oxidizing leach.
10. The process of embodiment 9, wherein pre-treating the ferronickel alloy comprises particle size reduction, such as atomization or granulation.
11. The process of any one of embodiments 1 to 10, wherein the oxidizing leach provides a discharge liquor and at least a portion of the discharge liquor is returned to the oxidizing leach.
12. The process of embodiment 7, wherein treating the ferronickel alloy with the oxidizing leach comprises:
   providing the peroxide treatment comprising treating the ferronickel alloy in the presence of peroxide, to provide a first discharge liquor,
   providing the POX treatment comprising treating the ferronickel alloy with the POX, to provide a second discharge liquor,
   returning at least a portion of the second discharge liquor to the peroxide treatment.
13. The process of embodiment 12, wherein returning the second discharge liquor to the peroxide treatment increases the concentration of nickel in the peroxide treatment.
14. The process of embodiment 12 or 13, wherein returning the second discharge liquor to the peroxide treatment adjusts the pH of the peroxide treatment.
15. The process of any one of embodiments 1 to 14, further comprising:
   producing an iron product.
16. The process of embodiment 15, wherein producing the iron product comprises producing hematite, jarosite, or goethite.
17. The process of embodiment 16, wherein producing the iron product comprises selectively removing iron in the form of hematite by pressure oxidation (POX) of the ferronickel alloy.
18. The process of any one of embodiments 3 to 17, further comprising a copper recovery step after the oxidizing leach, to recover at least a portion of the copper.
19. The process of embodiment 18, wherein the copper recovery step comprises a solvent extraction step, an electrowinning step, a cementation step, a sulfidation step, a pH adjustment step, an ion exchange step, or a pressure oxidation step.
20. The process of embodiment 19, wherein the copper recovery step comprises a cementation step wherein a portion of ferronickel alloy or nickel powder is provided to cement the copper.
21. The process of embodiment 19 or 20, wherein the copper recovery step comprises a cementation step in a vessel, such as a column.
22. The process of any one of embodiments 18 to 21, wherein at least a portion of the recovered copper is returned upstream to the step of treating the ferronickel alloy with the oxidizing leach or to a pre-leach step upstream of the oxidizing leach treatment step.
23. The process of any one of embodiments 3 to 22, wherein the copper is added to the process during the copper cementation step, the oxidizing leach, or a pre-leach step upstream of the oxidizing leach.
24. The process of any one of embodiments 3 to 23, wherein the copper comprises a copper-containing stream from a copper plant.
25. The process of any one of embodiments 1 to 24, further comprising:
   producing a nickel product.
26. The process of embodiment 25, wherein the oxidizing leach provides a discharge liquor comprising uncrystallised metal sulfate, and producing the nickel product comprises crystallizing the uncrystallised metal sulfate to form a crystallized nickel sulfate or a co-crystallized nickel and cobalt sulfate in a mother liquor.
27. The process of embodiment 26, wherein the nickel product is crystallized nickel sulfate.
28. The process of embodiment 26 or 27, further comprising refining the discharge liquor prior to crystallizing.
29. The process of any one of embodiments 26 to 28, further comprising separating the crystallized nickel sulfate or co-crystallized nickel and cobalt sulfate from the mother liquor.
30. The process of embodiment 29, wherein the mother liquor comprises a remaining uncrystallised metal sulfate, and the process further comprises basifying a portion of the mother liquor to convert the remaining uncrystallised metal sulfate to a basic metal salt.
31. The process of embodiment 30, further comprising using the basic metal salt upstream of crystallizing the metal sulfate.
32. The process of embodiment 31, wherein using the basic metal salt upstream comprises converting the basic metal salt back to the uncrystallised metal sulfate.
33. An improved method for direct refining ferronickel alloy, the improvement comprising providing copper during leaching of the ferronickel alloy.
34. The method of embodiment 33, wherein the leaching of the ferronickel alloy comprises an oxidizing leach.
35. A process for producing a nickel product, the process comprising:
   treating a ferronickel alloy feedstock with an oxidizing leach to form a leached material, the leached material comprising nickel, and iron;
   removing at least a portion of the iron from the leached material and recovering the nickel product.
36. The process of embodiment 35, wherein treating the ferronickel alloy feedstock with the oxidizing leach comprises treating the ferronickel alloy feedstock with a pressure oxidation (POX) leach.

37. The process of embodiment 35 or 36, wherein treating the ferronickel alloy feedstock with the oxidizing leach comprises treating the ferronickel alloy feedstock in the presence of copper.
38. The process of any one of embodiments 35 to 37, wherein treating the ferronickel alloy feedstock with the oxidizing leach comprises treating the ferronickel alloy feedstock in the presence of peroxide.
39. The process of any one of embodiments 35 to 38, wherein treating the ferronickel alloy feedstock with the oxidizing leach comprises treating the ferronickel alloy feedstock in the presence of sulfuric acid.
40. The process of embodiment 38 or 39, wherein treating the ferronickel alloy feedstock with the oxidizing leach comprises treating the ferronickel alloy feedstock at atmospheric pressure in a vessel, such as a column.
41. The process of any one of embodiments 38 to 40, wherein treating the ferronickel alloy feedstock with the oxidizing leach comprises:
    providing a peroxide treatment comprising treating the ferronickel alloy feedstock in the presence of peroxide; and
    providing a POX treatment comprising treating the ferronickel alloy feedstock with the POX.
42. The process of any one of embodiments 35 to 41, further comprising removing impurities from the leached material.
43. The process of any one of embodiments 35 to 42, wherein the nickel product comprises a nickel sulfate, a nickel and cobalt sulfate co-crystallized material, or a battery grade nickel material.
44. The process of any one of embodiments 35 to 43, wherein the recovery of the nickel product comprises crystallization, precipitation, or electrowinning.
45. The process of embodiment 44, wherein crystallization comprises crystallizing an uncrystallized nickel sulfate from the leached material to form a crystallized nickel sulfate in a mother liquor.
46. The process of embodiment 45, further comprising separating the crystallized nickel sulfate from the mother liquor.
47. The process of embodiment 46, wherein the mother liquor comprises a remaining uncrystallised nickel sulfate and the process further comprises basifying a portion of the mother liquor to convert the uncrystallised nickel sulfate to a basic nickel salt.
48. The process of embodiment 47, further comprising using the basic nickel salt upstream of crystallizing the nickel salt.
49. The process of embodiment 48, wherein using the basic nickel salt upstream comprises converting the basic nickel salt back to the uncrystallised nickel sulfate.
50. A process for producing nickel products from ferronickel that helps minimize residues and environmental impact by generating a useable hematite product from iron, a saleable potassium sulfate product from sulfate and a combined concentrated impurity stream to be used as an input for other metallurgical processes.

The embodiments described herein are intended to be examples only. Alterations, modifications and variations can be effected to the particular embodiments by those of skill in the art. The scope of the claims should not be limited by the particular embodiments set forth herein, but should be construed in a manner consistent with the specification as a whole.

All publications, patents and patent applications mentioned in this Specification are indicative of the level of skill those skilled in the art to which this invention pertains and are herein incorporated by reference to the same extent as if each individual publication patent, or patent application was specifically and individually indicated to be incorporated by reference.

The invention being thus described, it will be obvious that the same may be varied in many ways. Such variations are not to be regarded as a departure from the spirit and scope of the invention, and all such modification as would be obvious to one skilled in the art are intended to be included within the scope of the following claims.

What is claimed is:

1. A process for refining ferronickel alloy comprising treating the ferronickel alloy with an oxidizing leach,
    wherein treating the ferronickel alloy comprises
    adding a copper reagent, and
    treating the ferronickel alloy in the presence of copper from the copper reagent.
2. The process of claim 1, wherein treating the ferronickel alloy with the oxidizing leach further comprises:
    treating the ferronickel alloy with a pressure oxidation (POX) leach,
    treating the ferronickel alloy in the presence of peroxide, or
    treating the ferronickel alloy in the presence of sulfuric acid.
3. The process of claim 2, wherein treating the ferronickel alloy in the presence of peroxide comprises:
    providing a peroxide treatment comprising treating the ferronickel alloy in the presence of peroxide and sulfuric acid to provide a discharge liquor, and
    providing a POX treatment comprising treating the discharge liquor with the POX.
4. The process of claim 3, wherein treating the ferronickel alloy in the presence of peroxide comprises:
    providing the peroxide treatment comprising treating the ferronickel alloy in the presence of peroxide to provide a first discharge liquor,
    providing the POX treatment comprising treating the ferronickel alloy with the POX to provide a second discharge liquor, and
    returning at least a portion of the second discharge liquor to the peroxide treatment.
5. The process of claim 4, wherein returning the second discharge liquor to the peroxide treatment increases the concentration of nickel in the peroxide treatment.
6. The process of claim 4, wherein returning the second discharge liquor to the peroxide treatment adjusts the pH of the peroxide treatment.
7. The process of claim 1, wherein treating the ferronickel alloy with the oxidizing leach comprises treating the ferronickel alloy at atmospheric pressure in a vessel.
8. The process of claim 1, wherein the copper is provided as copper sulfide, copper oxide, or copper sulfate.
9. The process of claim 1, further comprising producing an iron product of hematite, jarosite, or goethite.
10. The process of claim 9, wherein producing the iron product comprises selectively removing iron in the form of hematite by pressure oxidation (POX) of the ferronickel alloy.
11. The process of claim 1, further comprising a copper recovery step after the oxidizing leach, to recover at least a portion of the copper from the copper reagent when treating the ferronickel alloy in the presence of copper.

12. The process of claim 11, wherein the copper recovery step comprises a solvent extraction step, an electrowinning step, a cementation step, a sulfidation step, a pH adjustment step, an ion exchange step, or a pressure oxidation step.

13. The process of claim 12, wherein the copper recovery step comprises a cementation step wherein a portion of ferronickel alloy or nickel powder is provided to cement the copper from the copper reagent.

14. The process of claim 11, wherein at least a portion of the recovered copper from the copper reagent is returned upstream to the step of treating the ferronickel alloy with the oxidizing leach or to a pre-leach step upstream of the oxidizing leach treatment step.

15. The process of claim 1, wherein the copper reagent is added to the process during the oxidizing leach, a copper cementation step, or a pre-leach step upstream of the oxidizing leach.

16. The process of claim 1, wherein the oxidizing leach provides a discharge liquor comprising uncrystallised metal sulfate, and further comprising producing a nickel product by crystallizing the uncrystallised metal sulfate to form a crystallized nickel sulfate or a co-crystallized nickel and cobalt sulfate in a mother liquor.

17. The process of claim 16, further comprising separating the crystallized nickel sulfate or co-crystallized nickel and cobalt sulfate from the mother liquor, wherein the mother liquor comprises a remaining uncrystallised metal sulfate, and the process further comprises basifying a portion of the mother liquor to convert the remaining uncrystallised metal sulfate to a basic metal salt, and using the basic metal salt upstream of crystallizing the metal sulfate.

18. The process of claim 17, wherein using the basic metal salt upstream comprises converting the basic metal salt back to the uncrystallised metal sulfate.

19. The process of claim 1, further comprising:
treating the ferronickel alloy with a pressure oxidation (POX) leach;
providing a discharge liquor from the oxidizing leach, the liquor comprising uncrystallised metal sulfate;
producing a nickel product by crystallizing the uncrystallised metal sulfate to form a crystallized nickel sulfate or a co-crystallized nickel and cobalt sulfate in a mother liquor;
separating the crystallized nickel sulfate or co-crystallized nickel and cobalt sulfate from the mother liquor, the mother liquor comprising a remaining uncrystallised metal sulfate;
basifying a portion of the mother liquor to convert the remaining uncrystallised metal sulfate to a basic metal salt, and using the basic metal salt upstream of crystallizing the metal sulfate.

20. An improved method for direct refining ferronickel alloy, the improvement comprising providing a copper reagent during leaching of the ferronickel alloy.

21. The method of claim 20, wherein the leaching of the ferronickel alloy comprises an oxidizing leach.

22. A process for producing a nickel product, the process comprising:
treating a ferronickel alloy feedstock with an oxidizing leach to form a leached material, the leached material comprising nickel, and iron;
removing at least a portion of the iron from the leached material and recovering the nickel product,
wherein treating the ferronickel alloy feedstock comprises adding a copper reagent and treating the ferronickel alloy feedstock in the presence of copper from the copper reagent.

23. The process of claim 22, wherein treating the ferronickel alloy feedstock with the oxidizing leach further comprises:
treating the ferronickel alloy feedstock with a pressure oxidation (POX) leach,
treating the ferronickel alloy feedstock in the presence of peroxide, or
treating the ferronickel alloy feedstock in the presence of sulfuric acid.

24. The process of claim 23, wherein treating the ferronickel alloy feedstock in the presence of peroxide comprises:
providing a peroxide treatment comprising treating the ferronickel alloy feedstock in the presence of the peroxide; and
providing a POX treatment comprising treating the ferronickel alloy feedstock with the POX.

25. The process of claim 22, wherein recovering the nickel product comprises crystallizing an uncrystallized nickel sulfate from the leached material to form a crystallized nickel sulfate in a mother liquor, separating the crystallized nickel sulfate from the mother liquor, wherein the mother liquor comprises a remaining uncrystallised nickel sulfate, and basifying a portion of the mother liquor to convert the uncrystallised nickel sulfate to a basic nickel salt.

26. The process of claim 25, further comprising using the basic nickel salt upstream of crystallizing the nickel salt.

27. The process of claim 26, wherein using the basic nickel salt upstream comprises converting the basic nickel salt back to the uncrystallised nickel sulfate.

* * * * *